United States Patent [19]

Jones

[11] Patent Number: 4,648,729
[45] Date of Patent: Mar. 10, 1987

[54] BEARING WELD RING

[75] Inventor: J. Ivor Jones, Sumter, S.C.

[73] Assignee: Kaydon Corporation, Muskegon, Mich.

[21] Appl. No.: 737,888

[22] Filed: May 28, 1985

[51] Int. Cl.$^4$ .................. F16C 19/16; F16C 33/58
[52] U.S. Cl. ..................................... 384/615; 384/617
[58] Field of Search ............... 384/510, 513, 537, 538, 384/559, 560, 561, 584, 585, 609, 615, 617, 618, 620, 622

[56] References Cited

U.S. PATENT DOCUMENTS

| | | | |
|---|---|---|---|
| 1,043,826 | 11/1912 | Harris | 384/591 |
| 2,545,122 | 3/1951 | Thompson | 384/592 |
| 2,697,644 | 12/1954 | Zeilman | 384/520 |
| 2,845,311 | 4/1954 | Cobb | 384/569 |
| 3,061,389 | 10/1962 | Bargmann | 384/592 |
| 3,677,032 | 7/1972 | Suzuki | 464/128 |
| 3,714,694 | 2/1973 | Dobson | 29/148.4 |
| 3,791,706 | 2/1974 | Dobson | 384/569 |
| 3,814,488 | 6/1974 | Rood | 384/613 |
| 4,023,869 | 5/1977 | Caldwell | 384/567 |
| 4,037,894 | 7/1977 | Sankey | 384/618 |
| 4,248,488 | 2/1981 | Sable | 384/593 |
| 4,395,140 | 7/1983 | Sable | 384/99 |
| 4,463,995 | 8/1984 | Andree | 384/620 |

FOREIGN PATENT DOCUMENTS

| | | | |
|---|---|---|---|
| 886394 | 10/1943 | France . | |
| 1071497 | 9/1954 | France | 384/609 |
| 570141 | 6/1945 | United Kingdom . | |

*Primary Examiner*—Stuart S. Levy
*Assistant Examiner*—David Werner
*Attorney, Agent, or Firm*—Price, Heneveld, Cooper, DeWitt & Litton

[57] ABSTRACT

A mount for a bearing is provided which includes a securing element that extends around a perimeter of at least one bearing ring and is welded to the support surface. The bearing ring includes an annular recess that receives a radial lip on the securing element. The securing element is at least temporarily secured to the bearing ring until the securing element is welded to the support surface. Thereafter, the configuration of the securing element fixes and secures the bearing on the support surface. Preferably both the annular recess and radial lip have at least one mating tapered surface which locate and provide a positive locking engagement between the securing element and the bearing ring without high manufacturing tolerances.

10 Claims, 5 Drawing Figures

BEARING WELD RING

BACKGROUND OF THE INVENTION

The present invention relates to mounts for large bearings and bearings which sustain very high loads, and in particular to bearings which are made from materials that do not readily permit welding of the bearing.

Large material handling units, for example large, mobile cranes or the like, conventionally require the use of a large diameter bearing to rotatably mount an upper material handling assembly on a vehicular base. In the case of a large crane or the like, the unit includes an upper cab or turret on which the lifting boom is mounted, and the turret is rotatably mounted on either a truck chassis or rail car chassis.

Due to the extremely high loads borne by such bearings, the actual load bearing surfaces on the bearing races must be made from a hardenable material such as medium carbon steel. Although such hardenable materials are able to sustain these high loads, these materials are difficult to weld by conventional techniques. The welding of such hardenable materials with conventional methods normally results in an embrittlement or cracking of the metal surrounding the weld. Due to the often microscopic character of such cracking, this condition is difficult to detect by simple inspection techniques. This can severely weaken the strength of a joint formed with such a weld and can lead to a catastrophic failure of the bearing and the crane structure supported thereon. It is possible to weld hardenable materials such as fifty carbon steel with special welding techniques. However, these techniques involve preheating of large steel components to elevated temperatures and this is often impractical.

For these reasons, most large diameter bearings are secured to surrounding structures by bolts or similar fasteners. However, bolt mounting of these bearings can also pose substantial problems, both during and after assembly of the unit. For example, during the initial manufacture of a large mobile crane, all of the bolt receiving apertures must be accessible both from above and below the bearing. This bolt mounting requires a workman to climb beneath or inside the equipment beneath the bearing support area to access the bolt aperture. After assembly, because of the cyclic loading of the crane the bearing mounting bolts can work loose. Often such equipment does not receive proper maintenance and the mounting bolts are allowed to loosen or fall away. Again, this can lead to a catastrpohic failure of the structure. Similar to the problems of initially assembling such bearings with mounting bolts, one reason for the low maintenance of such cranes is the difficulty in gaining access to the mounting bolts within the support base.

Further, after sufficient use the bearing can become worn and must be overhauled or replaced. Other situations arise in which bearings are retrofitted onto an existing crane, such as when an old roller bearing assembly is replaced with a newer ball bearing assembly or the like. In such retrofit situations, it is difficult in the field to match the bearing ring bolt apertures to the corresponding support base bolt apertures. Very close tolerances must be maintained on the placement of bolt apertures in the bearing ring if the new or refurbished bearing ring is to fit onto the existing support base.

Due to the above noted problems, practitioners have heretofore attempted to mount such bearings on large cranes or the like by various welding techniques. One such technique requires that the bearing ring itself be heated and maintained at high temperatures throughout the welding process in order to avoid embrittlement in the area surrounding the weld. Another technique involves the welding of the heated bearing ring to a mild steel weld band which is used as an attachment structure for later welding or otherwise suitably mounting the bearing to its support structure. However, such welding techniques can only be practiced in the controlled environment of a factory, and even under these controlled conditions, these techniques are both difficult and expensive. It will be readily apparent that any technique involving heating is very difficult, if not impossible, to conduct upon equipment while in the field.

Another attempt to weld-mount such bearings has required the centrifugal casting of the bearing rings from metals having different chemical compositions, in an attempt to produce a bearing ring having a hardenable composition in the bearing race area but a more ductile and weldable composition in the mounting area. As will be recognized, such a centrifugal casting method greatly increases the cost of the bearing manufacture.

In other applications spacers or pads or the like have been welded to supports beneath bearing rings, but such spacers still require that the bearing ring be secured by bolts to the support base. This type of mounting therefore does not avoid the problems associated with mounting bolts. Heretofore such large diameter, high hardness bearings have not been satisfactorily mounted by welding techniques.

SUMMARY OF THE INVENTION

According to the present invention, these and other problems in the prior art are solved by provision of a bearing having an annular weld ring. The bearing normally comprises first and second bearing rings with a plurality of rolling elements disposed therebetween. An annular recess is provided which extends about the perimeter of the bearing ring to be secured. The weld ring forms a bearing securing element that is received in the annular recess. The weld ring is provided with a composition that is readily weldable and it is at least temporarily secured in the annular recess with a suitable clamping arrangement or fasteners, such as a plurality of bolts or the like. The weld ring is secured to the appropriate support surface by an annular weld extending between the weld ring and support surface. Once the weld ring is welded to the support surface, interference between the weld ring and the annular recess fixes the bearing ring relative to the support surface and provides a strong joint between the bearing and the support surface even without the clamping arrangement or fasteners.

In the preferred embodiment of the invention the annular recess is provided with at least one and preferably two tapered walls and the weld ring is provided with a taper which mates with the tapered walls of the annular recess, thus insuring positive engagement over a large area between the weld ring and bearing ring. This tapered engagement also insures the proper positioning of the weld ring without the need for high manufacturing tolerances which increase the cost of the bearing.

It will be recognized that the bearing mount of the present invention greatly facilitates the original assembly as well as the later maintenance or replacement of a large bearing on a large mobile crane or the like. Further, the securing element of the present invention increases the integrity of the mounting of such bearing rings and reduces, if not eliminates, the probabilities of failure of the bearing mount due to a lack of maintenance. During initial assembly of the bearing, both the weld ring and bearing rings are readily accessible in order to bolt or otherwise fasten the weld ring to the bearing. When the bearing is mounted upon the support surface, an annular weld is simply made between the weld ring and support surface in order to secure the bearing in place. Bolt apertures are not required to be aligned between the bearing ring and support surface, and the need for providing an access to bolt apertures on the reverse side of the support surface is obviated. Once mounted, the weld ring forms a clamp-like element that positively locks the bearing ring in place, and it is immaterial if the fasteners securing the weld ring to the bearing ring are removed, since it is the interference between the weld ring and the annular recess that secures the bearing ring to the support surface. Further maintenance of the mount is not required.

The bearing mount of the present invention is also suitable for retrofitting replacement bearings on older equipment. The bearing ring and weld ring are assembled during manufacture of the bearing. Thereafter, the bearing weld ring is welded to the support surface without concern for the alignment of mounting bolt holes or bolt tightening sequences. In such an application, the weld ring is simply welded over the bolt apertures in the support surface used with the previous bearing. The bearing mount of the present invention also permits older roller bearings or the like to be replaced with newer four-point-contact ball bearings, or otherwise interchange various types of bearings without requiring new bolt holes to be located in the support surface.

Further, the provision of a mating taper on the inserted end of the weld ring and in the bearing ring annular recess insures a positive lock between these two elements which substantially eliminates distortion of the weld ring during welding. Also, the cyclic forces exerted by the bearing upon the securing element are evenly distributed across the tapered engagement surfaces of the weld ring, rather than being applied to an array of localized points associated with fasteners such as bolts which are subject to loosening.

These and other features, objects and results of the invention will be recognized by one skilled in the art from the written specification, claims and drawings appended hereto.

DETAILED DESCRIPTION OF THE PREFERRED EMBODIMENTS

Figure 1:
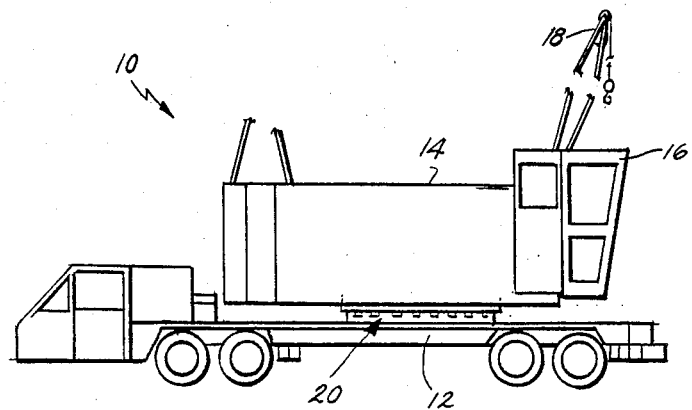
FIG. 1 is a fragmentary, side elevational view of a material handling mobile crane incorporating the bearing mount of the present invention.
Figure 2:
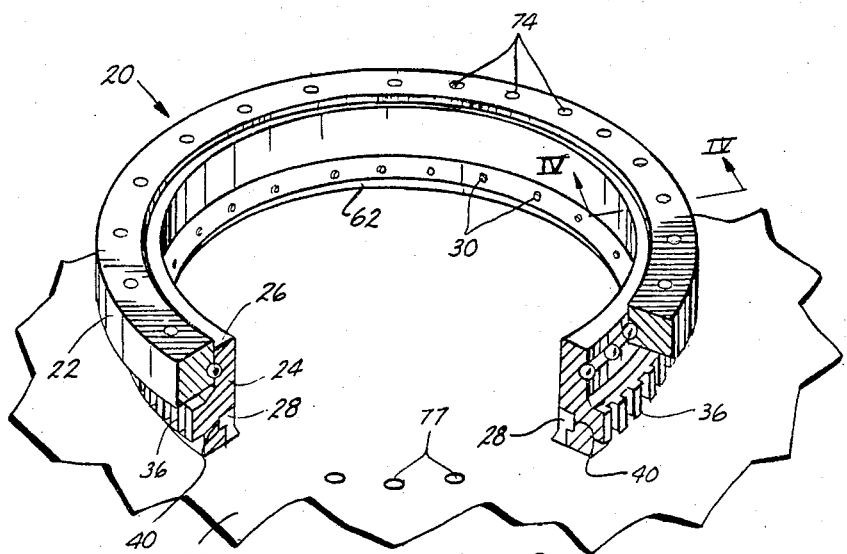
FIG. 2 is a fragmentary, perspective view of a bearing mounted on a lower support surface according to the present invention.
Figure 3:
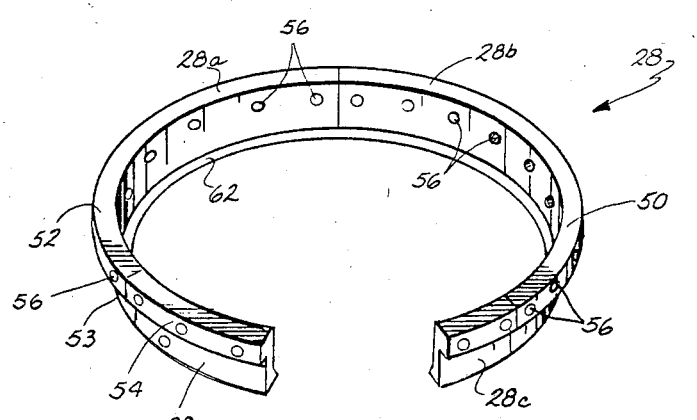
FIG. 3 is a fragmentary, perspective view of a weld ring used to mount the bearing illustrated in FIG. 2.

The present invention is particularly suitable for use with the type of bearings used in large mobile cranes such as that generally illustrated in FIG. 1 and identified by the numeral 10. Crane 10 is illustrated with an automotive chassis 12, but the crane may comprise a rail car chassis or the like that forms a vehicular support base. A turret 14 is disposed atop chassis 12. The turret 14 includes a conventional operations cab 16 and hoisting boom 18. Turret 14 is rotatably mounted on chassis 12 by means of a large diameter bearing 20. Bearing 20 is illustrated in FIG. 2 and includes an outer bearing ring 22 in which is received a mating inner bearing ring 24 and a plurality of rolling elements 26 disposed therebetween. Inner ring 24 is secured to a support surface 27 by an annular securing element or weld ring 28 which engages an annular recess 40 disposed on the inner ring 24. During initial assembly, weld ring 28 is secured to inner ring 24 by fasteners or bolts 30. Weld ring 28 is then welded to support surface 27. After bearing 20 is mounted on chassis 12, inner ring 24 is maintained in its secured condition on support surface 27 by the clamp-like action created by the annular configuration of weld ring 28 and the annular weld that fixedly secures weld ring 28 to chassis 12.

Figure 4:
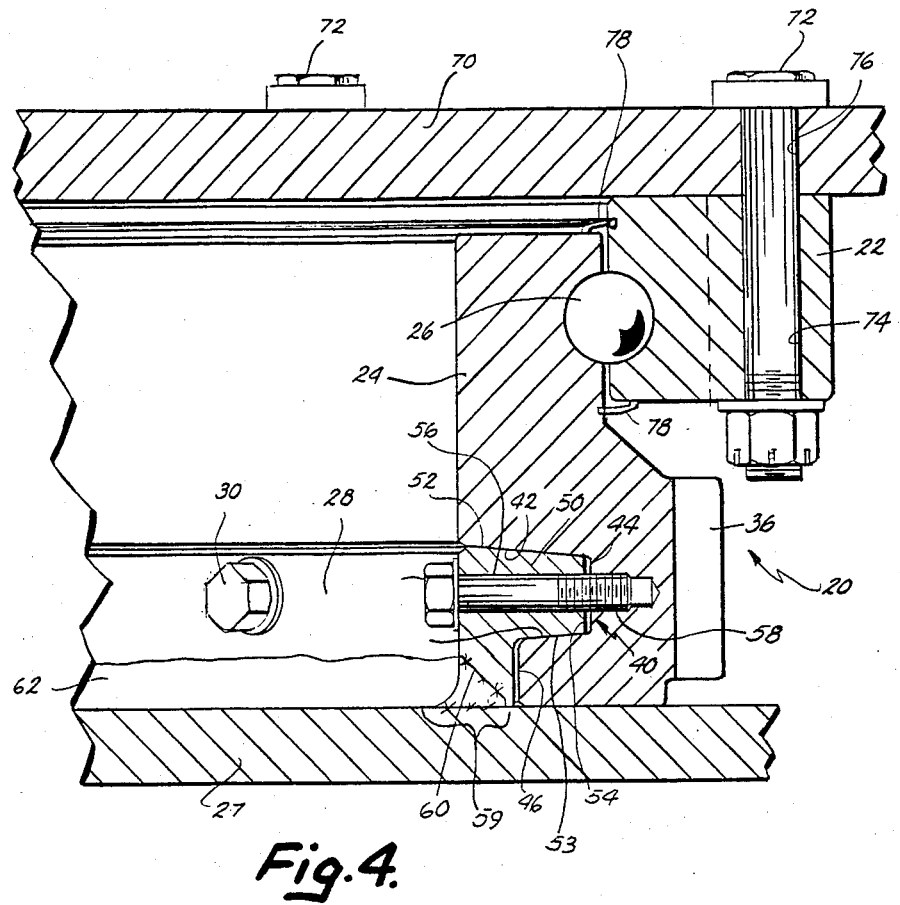
FIG. 4 is a fragmentary, sectional view of the mounted bearing taken along plane IV—IV of FIG. 2, illustrated with the bearing mounted on both upper and lower support surfaces, the lower support surface includes a mount constructed according to the present invention while the upper surface includes a conventional bolt ring.

With reference now also to FIG. 4, bearing 20 is a large diameter, high load thrust ball bearing. Inner ring 24 forms a first roller pathway for ball bearing rolling elements 26 and outer ring 22 forms a second roller pathway for the rolling elements. Normally the pathways are provided with a gothic arch (not illustrated) to provide a four-point-contact with the roller elements. Although roller elements 26 are illustrated as ball bearings, alternatively, other types of rolling elements may be used. Inner race 24 is made from a hardenable material, preferably a medium carbon steel and most often a fifty carbon steel. When hardened, the surface of this material forms roller pathways which withstand the large forces generated by the load supported on bearing 20 without brinelling. A ring gear 36 is provided on the outer perimeter of inner bearing ring 24. As best illustrated in FIG. 2, the ring gear 36 extends about the circumference of inner bearing ring 24. A positioning drive motor with a pinion gear (not shown) is mounted on turret 14 so that the pinion engages gear teeth 36. This pinion gear "walks around" teeth 36 on inner bearing ring 24 in order to selectively position turret 14. Alternatively, the ring gear is disposed on outer bearing ring 22 and the drive motor and pinion gear are mounted on chassis 12, in order to selectively position the two bearing rings relative to each other.

With reference to FIG. 4 as previously noted, an annular recess 40 is disposed on inner bearing ring 24. The recess 40 receives weld ring 28. Recess 40 includes upper and lower tapered walls 42 and 43, respectively, that taper inwardly to a recessed end wall 44. While in the preferred embodiment both walls 42 and 43 are provided with a taper. In other embodiments only one wall may be tapered. Recess 40 includes a shoulder 46 that extends downwardly from the lower tapered wall 43 to the bottom of bearing ring 24. The weld ring 28 does not engage the shoulder 46 but extends therealong to engage support surface 27 of chassis 12.

In the embodiment depicted in FIGS. 2-5, annular recess 40 extends around the inner perimeter of inner ring 24. In other embodiments of the invention where the ring gear 36 is disposed on the outer perimeter of bearing ring 24, annular recess 40 may extend about the outer perimeter of bearing ring 24. In either case the configuration and positioning of weld ring 28 about the perimeter of bearing ring 24 maintains bearing ring 24 in a fixed position. For this reason, as used herein "extending about the perimeter of" may interchangeably refer to extending about either the inner or outer diameter of the bearing ring.

In the present embodiment, weld ring 28 is made up of three arcuate sections 28a, 28b and 28c (FIG. 3) that mate to form a ring. Weld ring 28 is formed from three separate sections to facilitate assembly onto bearing ring 24 and receipt in annular recess 40. Weld ring 28 is made from a readily weldable mild steel that provides a reliable and strong weld joint between weld ring 28 and support surface 27. Weld ring 28 includes an upper, radially outwardly extending lip 50 (FIG. 4) that is received in annular recess 40. Lip 50 includes upper and lower tapered faces 52 and 53 that taper radially outwardly down to a blunt end face 54. Tapered faces 52 and 53 mate with tapered walls 42 and 43 of recess 40 to provide a positive locking engagement between the weld ring 28 and the bearing ring 24. Lip 50 extends outwardly slightly less than the depth of recess 40, so that when lip 50 is inserted in annular recess 40, blunt end face 54 is spaced slightly from end wall 44. This spacing of end wall 44 and end face 54 permits lip 50 to tightly engage taper walls 42 without requiring that a close tolerance be maintained during manufacture of weld ring 28 and recess 40. It will be noted that in an alternative bearing mount noted above having an annular recess in the outer perimeter of the bearing ring, the radially extending lip extends radially inwardly of the arcuate weld ring.

With reference now to FIG. 4, a plurality of generally horizontal bolt apertures or bores are provided at 56 for receiving a plurality of fastening bolts 30. Each bore 56 is aligned with a threaded bolt aperture 58 that extends generally horizontally into bearing ring 24 at recess 40. Bolt apertures 56 have a diameter slightly greater than the shaft diameter of bolts 30, so that bolts 30 may be readily slid through apertures 56 and also to provide a greater tolerance in the alignment of bolt apertures 56 and 58. Further, since the threads of bolts 30 do not engage the sides of bolt apertures 56, the tightening of bolts 30 causes a clamping action to be exerted, drawing lip 50 into recess 40 and engaging tapered faces 52 and 53 with tapered walls 42 and 43.

Beneath lip 50 is a weld zone 59 that is received in the shallow portion of annular recess 40 adjacent shoulder 46. Weld zone 59 extends between the weld ring 28 and the lower support surface 27. Weld ring 28 fits flush with the inner perimeter of inner ring 24. The lower end of the weld ring 28 which is engaged by weld zone 59 is provided with an angled surface 60. Angled surface 60 provides an appropriate anchoring surface for an annular weld 62 that is formed between angled surface 60 and lower support surface 27.

Outer bearing ring 22 is illustrated in FIG. 4 mounted in conventional fashion to an upper support surface 70 on the crane turret. Outer bearing ring 22 forms the outer race for roller elements 26 and is secured to upper support surface 70 by an annular array of bolts 72. Vertically oriented bolt apertures 74 extend through outer bearing ring 22, and are aligned with bolt apertures 76 in upper support surface 70. As illustrated in FIG. 2, bolt apertures 74 open through the upper surface of outer ring 22. FIG. 2 also illustrates that in cases where the welded bearing mount of the present invention is retrofitted on an existing machine, weld ring 28 is welded to support surface 48 over unused mounting bolt holes 77. A conventional pair of seals 78 extend between bearing rings 22 and 24 to provide a seal for roller elements 26.

Figure 5:
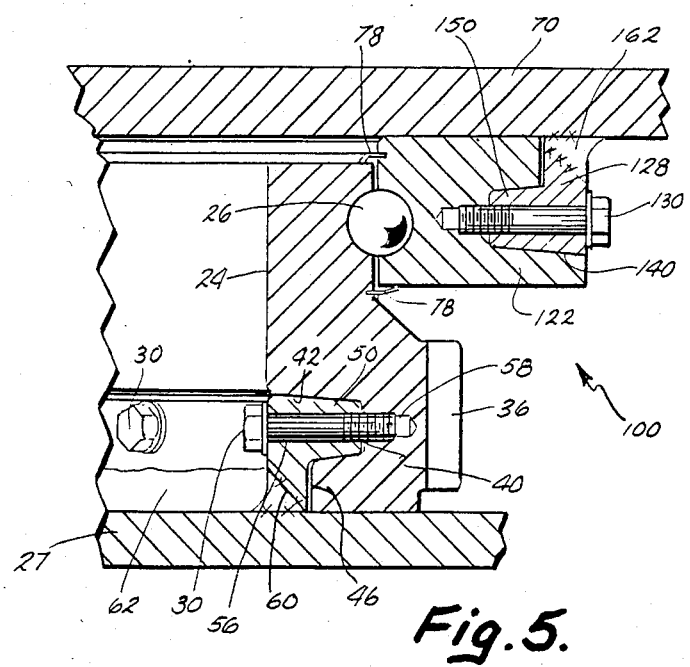
FIG. 5 is a fragmentary, sectional view of a bearing mounted on both upper and lower support surfaces with a mount constructed according to the present invention.

Another embodiment of the present invention is illustrated in FIG. 5 and referenced generally by the reference numeral 100. The second preferred embodiment of bearing 100 includes an inner bearing ring 24 and weld ring 28 identical to the first preferred embodiment described above. Bearing 100 differs in that an outer bearing ring 122 is secured to upper support surface 70 by another weld ring 128. Weld ring 128 is substantially identical to weld ring 28, with the exception that weld ring 128 extends around the outer perimeter of bearing ring 122. Outer bearing ring 122 therefore has an annular recess 140 that extends around the outer circumference of bearing ring 122, and weld ring 128 has an inwardly radially extending lip 150 that is inserted in annular recess 140. Weld ring 128 is mounted on outer bearing ring 122 by a spaced series of bolts 130, and weld ring 128 is secured to upper support surface 70 by an annular weld 162.

Although the preferred embodiment above is described in relation to a bearing for a large material handling unit or crane, the described bearing mount may be advantageously used to mount large diameter bearings in a variety of environments. Further, although both weld ring 28 and annular recess 40 extend around the entirety of the bearing ring, both weld ring 28 and annular recess 40 can extend intermittently about the bearing ring perimeter, with short clamp-like securing elements being received in similarly short, spaced recesses.

It is to be understood that the above is merely a description of the preferred embodiment, and one skilled in the art will recognize that various modifications or improvements may be made without departing from the spirit of the invention that is disclosed herein. The scope of protection that is afforded is to be determined by the claims which follow and the breadth of interpretation which the law allows.

The embodiments of the invention in which an exclusive property or privilege is claimed are as follows.

1. A bearing mount comprising:
   a first bearing ring;
   rolling members disposed at said first bearing ring;
   a second bearing ring, said second bearing ring mating with said first bearing ring and said rolling members;
   at least one of said first bearing ring and said second bearing ring having a composition such that said one bearing ring is not readily weldable without damaging said one bearing ring;
   a bearing securing element having means for securing to said one bearing ring, said bearing securing element having a composition that is readily weldable to a support without requiring securing bolts between said bearing securing element and said support, whereby said bearing is provided with the ability to be weld-mounted to said support;
   said one bearing ring including an annular recess about a perimeter thereof;

said bearing securing element including a radially extending lip received in said annular recess, and said securing element includes a portion disposed adjacent said support to facilitate welding thereto;

both said annular recess and said radially extending lip having at least one mating, tapered engagement surface; and said lip having an extending length and said annular recess having a depth greater than the extending length of said lip, whereby spacing is provided between the end of said lip and a wall of said annular recess.

2. The bearing mount of claim 1, wherein:
said annular recess and said securing element extend about the entire perimeter of said one bearing ring.

3. The bearing mount of claim 1, wherein:
said securing element is at least temporarily bolted to said one bearing ring with said radially extending lip received in said annular recess.

4. The bearing mount of claim 1, wherein:
each of said bearing rings has one of said bearing securing elements associated therewith.

5. A bearing mount for securing a bearing on a support, comprising:

a first bearing ring;

rolling members disposed at said first bearing ring;

a second bearing ring, said second bearing ring mating with said first bearing ring and said rolling members, said second bearing ring having annular recess extending about a perimeter thereof;

a plurality of securing elements each having a lip extending radially thereon, said securing elements spaced about said second bearing ring and having said extending lips received in said annular recess, said securing elements each having a welding zone weldable to said support;

said securing elements being arcuately shaped to extend around said perimeter of said first bearing ring; and said annular recess and said extending lips both including at least one mating, tapered engagement surface, said annular recess being sufficiently deep to provide clearance between the extended end of said extending lip and a wall of said annular recess.

6. The bearing mount of claim 5, wherein:
said securing elements are at least temporarily bolted to said second bearing ring.

7. A bearing mount for securing a bearing on a crane, the crane having a mobile base and a rotating turret thereon, comprising:

a first bearing ring having means for securing said first bearing ring to said base, and having an inner perimeter and an outer perimeter;

roller elements disposed at said first bearing ring;

a second bearing ring mating with said first bearing ring and said roller elements, said second bearing ring having means for securing said second bearing ring to said turret, and having an inner perimeter and an outer perimeter;

one of said securing means including an annular recess about one of said inner ring perimeter and said outer ring perimeter;

a securing element having a radially extending inserting end received in said annular recess, and having a welding zone with a composition that provides said securing element with the ability to be welded to the corresponding one of said base and said turret; and said annular recess and said inserting end both having at least one mating tapered engagement surface that provide for positive engagement between said inserting end and said engagement surfaces of said annular recess.

8. The bearing mount of claim 7, wherein said securing element is at least temporarily secured to said one bearing ring by a plurality of bolts.

9. The bearing mount of claim 8, wherein said securing elements are arcuately shaped; and a plurality of said securing elements received in said annular recess.

10. The bearing mount of claim 9, wherein:
said annular recess and said securing elements extend about the entirety of said one perimeter.

* * * * *